United States Patent
Pan et al.

(10) Patent No.: US 10,205,967 B2
(45) Date of Patent: Feb. 12, 2019

(54) EXTENDED YCC FORMAT FOR BACKWARD-COMPATIBLE P3 CAMERA VIDEO

(71) Applicant: Apple Inc., Cupertino, CA (US)

(72) Inventors: Hao Pan, Cupertino, CA (US); Yingjun Bai, San Jose, CA (US); Xuemei Zhang, Mountain View, CA (US); Haitao Guo, Cupertino, CA (US); Munehiro Nakazato, Cupertino, CA (US); Xiaohua Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 15/070,620

(22) Filed: Mar. 15, 2016

(65) Prior Publication Data
US 2017/0272780 A1  Sep. 21, 2017

(51) Int. Cl.
*H04N 19/86* (2014.01)
*H04N 19/12* (2014.01)
*H04N 19/156* (2014.01)
*H04N 19/186* (2014.01)
*H04N 19/44* (2014.01)

(52) U.S. Cl.
CPC ............ *H04N 19/86* (2014.11); *H04N 19/12* (2014.11); *H04N 19/156* (2014.11); *H04N 19/186* (2014.11); *H04N 19/44* (2014.11)

(58) Field of Classification Search
CPC ......... H04N 11/20; H04N 19/86; H04N 19/12
USPC .......................... 348/384.1, 453; 375/240.26
See application file for complete search history.

(56) References Cited

U.S. PATENT DOCUMENTS

| | | |
|---|---|---|
| 6,282,312 B1 | 8/2001 | McCarthy |
| 2003/0123722 A1 | 7/2003 | Newman |
| 2011/0128438 A1 | 6/2011 | Yamashita |
| 2013/0222411 A1 | 8/2013 | Tripathi |

OTHER PUBLICATIONS

Rec. ITU-R BT.709-3, "Parameter Values for the HDTV Standards for Production and International Programme Exchange," 1990, 28 pages.
Rec. ITU-R BT. 601-6, "Studio encoding parameters of digital television for standard 4:3 and wide-screen 16:9 aspect ratios," 1982, 13 pages.
Nakatsue, et al., "19.2: xvYCC: A New Standard for Video Systems using Extended-Gamut YCC Color Space," SID Symposium Digest of Technical Papers, Jan. 2006, 5 pages.
Rec. ITU-R BT.1361, "Worldwide unified colorimetry and related characteristics of future television and imaging systems," 1998, 13 pages.
Rec. ITU-R BT.2020, "Parameter values for ultra-high definition television systems for productions and international programme exchange," Aug. 2012, 7 pages.
Rec. ITU-T H.264, "Advanced video coding for generic audiovisual services," Jan. 2012, 680 pages.
Rec. ITU-T H.265, "High efficiency video coding," Apr. 2015, 634 pages.

*Primary Examiner* — Albert Kir
(74) *Attorney, Agent, or Firm* — Blank Rome LLP

(57) ABSTRACT

This disclosure relates to a wide gamut encoder capable of receiving a wide gamut color image in accordance with a wide gamut standard. The encoder can encode one or more wide gamut color image pixel values into portions of narrow gamut encoding elements for transmission to a video encoder. The encoder can implement an advanced extended YCC format that is backward compatible with a P3 color gamut.

19 Claims, 14 Drawing Sheets

EXTENDED YCC FORMAT FOR BACKWARD-COMPATIBLE P3 CAMERA VIDEO

TECHNICAL FIELD

This disclosure relates generally to encoding video information and in particular to an operation for encoding video information using an extended YCC format that is backward compatible with a P3 color gamut. Other embodiments are also described herein.

BACKGROUND

DCI-P3, also know as DCI/P3, is a common color space for digital movie projection in the American film industry. DCI-P3 covers most of the range of naturally occurring surface colors with the most distinct drawbacks in the green-blue range. The gamma (2.6) and white point (x=0.3140, y=0.3150) in DCI-P3 standard are optimized for movie theaters' viewing environment, and are not suitable for more advanced electronic display devices, such as may be found in modern portable devices.

SUMMARY

Electronic displays can be designed to display images in various formats. For displays that feature a wide color gamut (WCG), instead of using sRGB primaries, DCI-P3 primaries may be used. Displays featuring a WCG have more saturated red primaries than sRGB panels; ranging from 0.68 to 0.32 according to the CIE 1931 x-y color chromatic chart (also known as the CIE Color Space Chromaticity Diagram derived from the work of William David Wright and John Guild), compared to the range of 0.64 to 0.32 on sRGB panels. WCG panels also have more green primaries than sRGB panels; having a range from 0.265 to 0.69, compared to a range of 0.3 to 0.6 for sRGB panels. The number of saturated blue primaries in WCG is the same as in sRGB, ranging from 0.15 to 0.06.

A WCG video format is disclosed which supports devices configured to operate in the WCG (WCG panels, for example), is compatible with existing sRGB devices, has minimal impact on video bitstreams (such as H264 or HEVC, for example), and which is deployable on existing hardware, (such as iOS/Mac™ hardware).

The above summary does not include an exhaustive list of all aspects of the presently disclosed subject matter. It is contemplated that the claimed subject matter includes all systems and methods that can be practiced from all suitable combinations of the various aspects summarized above, as well as those disclosed in the Detailed Description below and particularly pointed out in the claims filed with the application. Such combinations have particular advantages not specifically recited in the above Summary.

BRIEF DESCRIPTION OF THE DRAWINGS

Various embodiments of the disclosed subject matter are illustrated by way of example and not by way of limitation in the accompanying drawings in which like references indicate similar elements. It should be noted that references to "an" or "one" embodiment in this disclosure are not necessarily to the same embodiment, and they mean at least one. Also, in the interest of conciseness, a given figure may be used to illustrate the features of more than one embodiment, or more than one species of the invention, and not all elements in the figure may be required for a given embodiment or species.

DETAILED DESCRIPTION

Aspects of this disclosure pertain to an encoding method and encoding format which is backward compatible with existing sRGB devices, but which accommodates the broader P3 Wide Color Gamut (WCG) that has x-y color chromatic values of 0.68 and 0.32 for red, 0.265 and 0.69 for green, and 0.15 and 0.06 for blue.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter.

Figure 1:
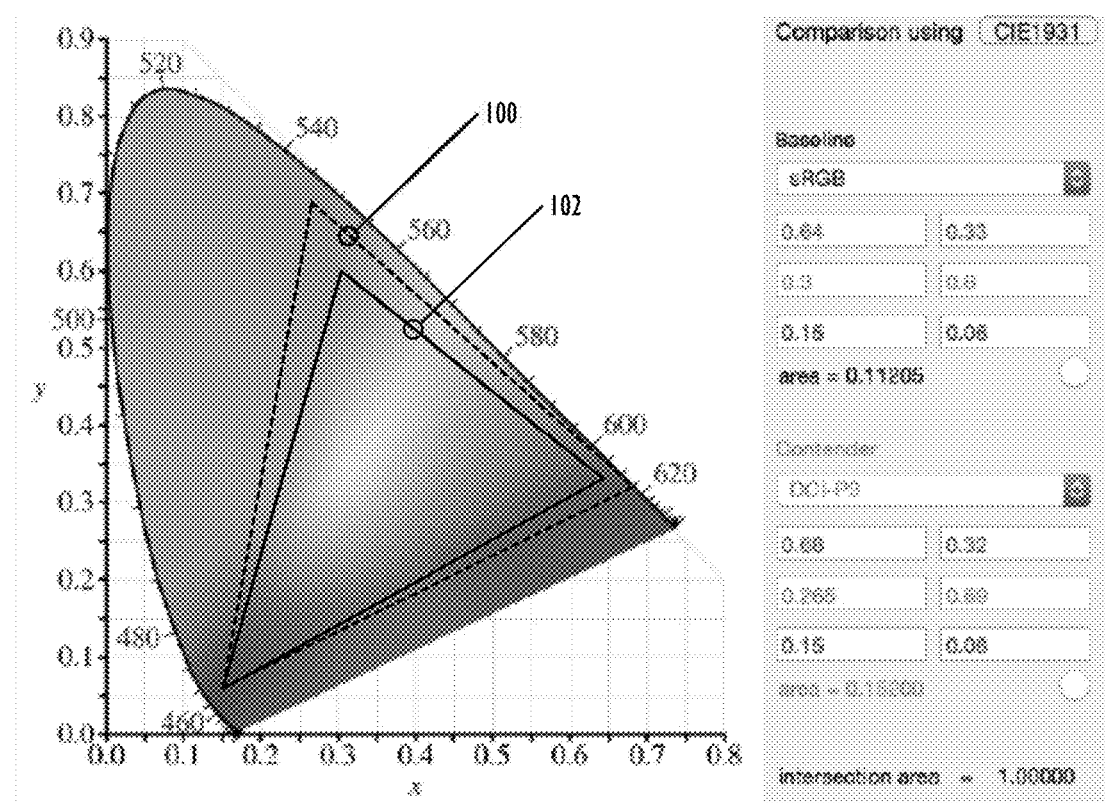
FIG. 1 illustrates a P3 color gamut versus a sRGB in the CIE 1931 x-y color chromatic chart.

FIG. 1 illustrates the P3 color gamut 100 versus the sRGB color space 105 in the CIE 1931 x-y color chromatic chart. As indicated in FIG. 1, P3 panels have more saturated red and green primaries than sRGB panels, and the same blue primary as sRGB panels. As is known by those of skill in the art, sRGB is a standard RGB color space. An RGB color space is any additive color space based on the RGB color model. As noted above, DCI-P3 is a standard color space used in the film industry. The gamma (2.6) and white point (x=0.3140, y=0.3150) in the DCI-P3 standard are optimized for movie theaters' viewing environment, and not suitable for modern mobile device viewing environments (e.g., laptop or notebook computer systems, tablet computer systems, and other personal mobile devices such as mobile phones or music/entertainment systems). A display panel of this disclosure uses the sRGB gamma and its white point D65. However the P3 color space of this disclosure has the broader red and green spectra mentioned above.

Cameras, such as those in mobile devices, exist which can capture P3 content, that is color in P3 color space 100. Such captured content can be processed into an sRGB image or into a P3 image by using different color processing parameters during image signal processing (ISP). Camera ISP can be configured to output P3 images, and these P3 images can be previewed and stored and later played back on devices having P3 panels. However, RGB values of a P3 image cannot be used to directly drive panels on many devices which do not have P3 display capability—such as those configured to display sRGB values. When P3 content is directly transmitted to an sRGB device, the sRGB device requires color management to map P3 RGB values to sRGB RGB values. For P3 still images in JPEG format, there is an International Color Consortium (ICC) profile that serves this purpose. As will be understood by those of skill in the art, a profile defines the color mapping function between an input source and an output device. If an sRGB device has a color management system that implements the ICC profile, the sRGB device can properly render and display P3 still images. However, the ICC profile is not universally supported in the video world. For example, existing sRGB devices do not have a color management mechanism for H264 or H265 video.

Some embodiments of this disclosure are directed to a color gamut video format that overcomes the above-mentioned deficiencies. At least one embodiment is a color gamut, referred to as a wide color gamut (WCG) video format herein, which fully supports devices which have both P3 capture and display capability. At least one embodiment is a WCG which is backward compatible with an sRGB device, meaning the WCG can be recognized by, and played/displayed, on an sRGB device. At least one embodiment is a WCG which has minimal impact on an H264 or HEVC video bitstream, and which requires minimal tuning for the associated encoding-decoding device, also known as a codec. At least one embodiment is a WCG which enables fast deployment, as well as low cost decoding and encoding.

An embodiment of this disclosure is a WCG video format, which will be referred to as an advanced eYCC (extended YCC) format, or simply 'aYCC.' At least one embodiment of the aYCC is optimized for use in the P3 D65 color space. As is known to those of skill in the art, DCI-P3 D65 uses Illuminant D65 for its white point. At least one embodiment of the aYCC is configured to serve as a transmission and storage format that works well with some mobile device hardware, and with the buffer format CIF10 for WCG.

As intimated above, the aYCC format of this disclosure extends a YCC (YCbCr) format which can accommodate WCG colors and which is backward compatible with sRGB devices. There currently exist two types of YCC formats. The BT.709 format is designed for high definition (HD) content. The BT.601 is designed for standard definition (SD) content. BT.709 and BT.601 have the same sRGB primaries, but they implement different YUV and RGB conversion matrices. Both BT.709 and BT.601 work in the standard video range, that is, their luma range is [16-235] and their chroma range is [16-240] for an 8 bit YCC. As HD is the more frequently used content, BT.709 is the most widely used YCC format. The aYCC format described in this disclosure uses BT.709 as a starting point, however, the BT.601 can also be used in a similar fashion.

In order to be backward-compatible with existing BT.709 YCC, the aYCC in accordance with this disclosure uses the same sRGB primaries, the same matrix, and the same offset values as BT.709. However, when representing WCG colors, RGB values are extended to the [0,1] range. When RGB colors go out of range, it causes YCC values go out of the video range. To obviate this issue, the aYCC format uses the codes out of the video range but which nevertheless reside in the 8-bit range of YCC (that is, 0-15 and 236-255 for luma, and 0-15 and 241-255 for chroma) in order to retain the increased information found within the WCG.

In earlier eYCCs, the increase in the RGB range in the eYCC is bounded by the limit imposed by the video range of the BT.709 YCC. The RGB range of the eYCC is [−0.08, 1.08], which is a 16% increase over the range of the BT.709 YCC. However, the WCG gamut must be "squeezed" into the range of [−0.08, 1.08] in order to be fully covered by eYCC. What follows is a discussion of one approach to convert regular P3 YCC (using BT.709 parameters but with P3 primaries) into the eYCC (using BT.709 parameters but using sRGB primaries), and one method to decode the eYCC into the sRGB and P3 color spaces. These methods are encapsulated by at least one embodiment of the aYCC of this disclosure.

Figure 2:
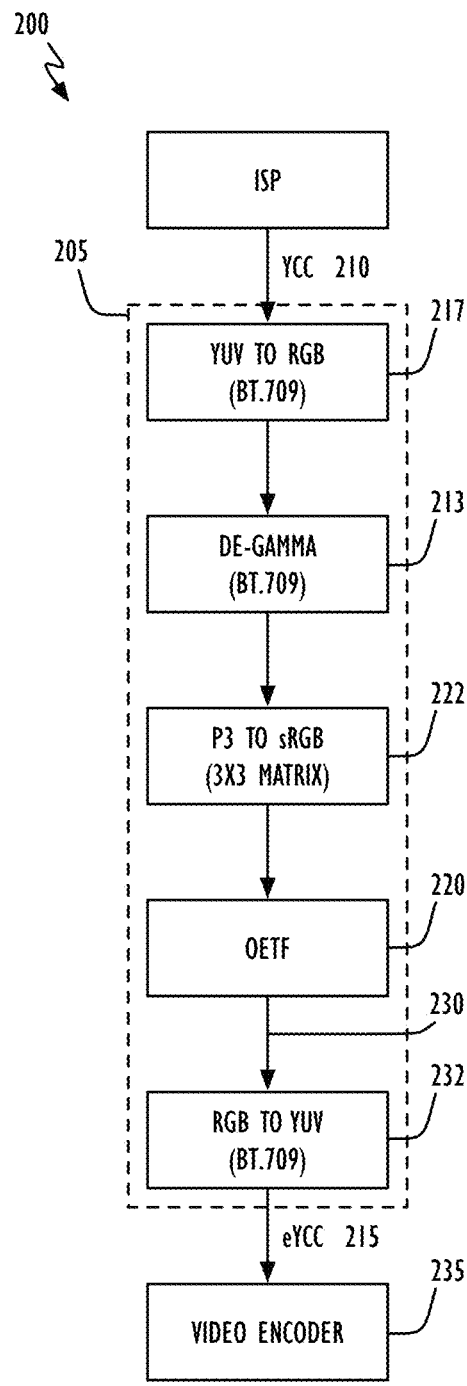
FIG. 2 illustrates a possible work flow of an aYCC encoder in accordance with an exemplary embodiment of this disclosure.

FIG. 2 shows illustrative work flow 200 of aYCC encoder 205 which may be used to encode P3 colors. The illustrated aYCC encoder 205 takes P3 YCC input 210 (using BT.709 parameters but P3 primaries as noted above), and converts it to aYCC output 215 (using BT.709 parameters but sRGB primaries). In one embodiment, the de-gamma curve 213 in aYCC encoder 205 has the same electro-to-optical transfer function (OETF) curve as BT.709; the 3×3 matrix and offset of between YUV and RGB conversion 217 can also be the same as those defined in BT.709. If, for example, aYCC is 8 bit, the offset and the YUV to RGB matrix 217 may be:

$$\begin{bmatrix} 16 \\ 128 \\ 128 \end{bmatrix} \text{ and }$$

$$\begin{bmatrix} 0.0045662 & 0 & 0.0070304 \\ 0.0045662 & -0.00083627 & -0.0020898 \\ 0.0045662 & 0.0082839 & 0 \end{bmatrix},$$

respectively.

In one embodiment the 3×3 matrix (T) 219 of P3 to sRGB conversion 222 in aYCC encoder 205 can be derived from sRGB to XYZ and P3 to XYZ matrices as shown below:

$$T = T_{P3\text{-}to\text{-}XYZ} * T_{XYZ\text{-}to\text{-}sRGB} = T_{P3\text{-}to\text{-}XYZ} * T_{sRGB\text{-}to\text{-}XYZ}^{-1} \quad (\text{eqn. 1})$$

$$= \begin{bmatrix} 1.2249 & -0.2249 & 0 \\ -0.0421 & 1.0421 & 0 \\ -0.0196 & -0.0786 & 1.0983 \end{bmatrix}$$

From above, one can derive the output range of RGB channels in the linear domain respectively, to-wit: red range: [−0.225 1.225]; green range: [−0.042 1.042]; and blue range: [−0.0786 1.0983]. Thus, the output range of matrix operation or input range of OETF 220 is [−0.225 1.225].

The optical-to-electro transfer function OETF operation 220 in the aYCC encoder (the EOTF operation in aYCC decoder is the reverse of this OETF) is thus an important part in the example aYCC decoder 205 in FIG. 2. In this example, OETF 220 helps determine backward compatibility, and determines the coverage of WCG gamut by the aYCC. The output 230 of OETF 220 is translated from RGB to YUV 232 to produce aYCC output 215 of encoder 205. Output 215 may then be encoded by a video encoder 235 as illustrated.

In order to maintain the backward compatibility referenced above, in addition to using the same sRGB primaries as BT.709 and BT.601, OETF 220 of any aYCC encoder 205 may be the same as the OETF of BT.709 in the range of [0, 1]. Different YCC formats vary from one another at their OETF 220 curves for negative and greater-than-1 RGB input.

In at least one embodiment, RGB to YCC conversion must limit the RGB range to [−0.08, 1.08] in order to avoid clamping on YCC. In the case of the P3 color space 100, the RGB range is [−0.225, 1.225] in the linear domain. Therefore, an OETF curve will need to map the range of [−0.225, 1.225] into the range of [−0.08, 1.08] in order to achieve 100% coverage of the P3 color space 100.

Figure 3:
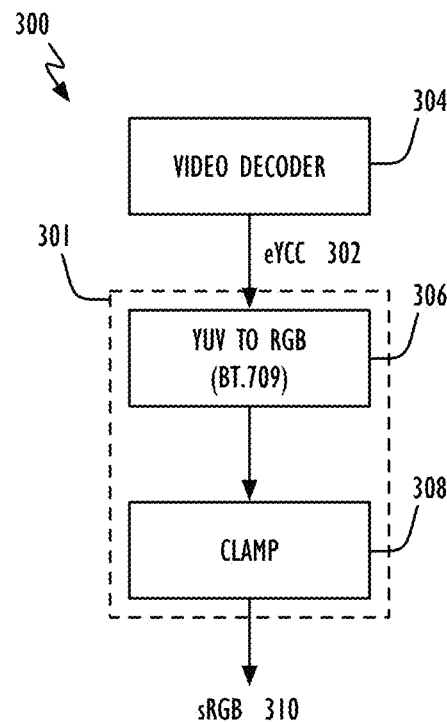
FIG. 3 illustrates a possible work flow of an aYCC decoder in accordance with an exemplary embodiment of this disclosure.

FIG. 3 illustrates an example workflow 300 for an example aYCC decoder 301. As shown, the aYCC decoder 301 may convert eYCC output 302 from a video decoder 304 to sRGB colors 105. This decoder 301 may be similar to a BT.709 YCC decoder, because aYCC (215, 300) is backward compatible with sRGB devices, as noted above.

When aYCC decoder 301 decodes P3 content in aYCC format to sRGB colors 105, aYCC decoder 301 may map the P3 color gamut 100 to the sRGB gamut 105 by expressing the P3 content in the linear domain, changing RGB values from using P3 primaries to using sRGB primaries 306, clamping 308, and then reverting to the gamma domain, to produce output 310 in the sRGB color space 105. At least one advantage of the method 300 described for the aYCC decoder 301 is that the colors produced may be vivid.

Figure 4B:
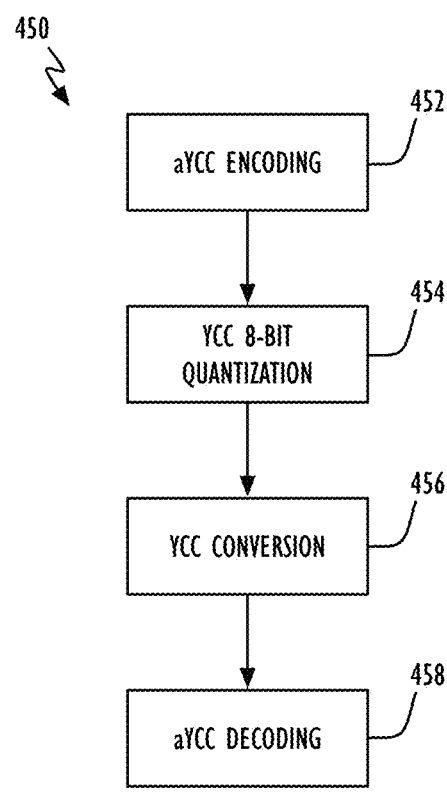
FIG. 4B illustrates an example aYCC encoding and decoding method in accordance with an embodiment of this disclosure.
Figure 4A:
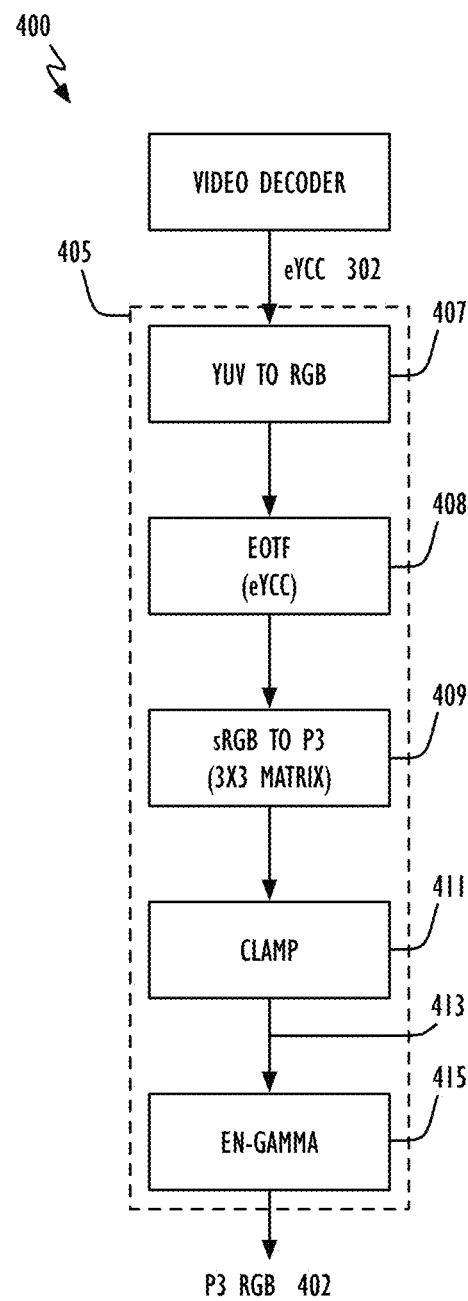
FIG. 4A illustrates a possible work flow of an aYCC encoder for converting to P3 colors in accordance with an exemplary embodiment of this disclosure.

FIG. 4A illustrates a possible work flow 400 for converting eYCC information 302 from a video decoder 304, to P3 colors 100 as output 402. In the example of FIG. 4A, aYCC encoder 405 takes eYCC 302 as input and converts it to P3 colors 100.

The de-gamma curve of aYCC encoder 405 uses the EOTF 407 curve of BT.709. The 3×3 matrix and offset for YUV and RGB conversion 407 are the same as those defined in BT.709. The 3×3 matrix of sRGB to P3 conversion 409 in aYCC decoder 405 is the inverse of the 3×3 matrix of P3 to sRGB conversion matrix (see 222, FIG. 2) in aYCC encoder 205 defined in Eq. (1) above. Converting the sRGB formatted information to the P3 format may mean that the P3 information is clamped 411. The clamped P3 information 413 is converted in accordance with en-gamma curve 415. The en-gamma curve 415 in aYCC decoder 405 is the inverse of OETF 220 curve in aYCC encoder 205, (see FIG. 2). The aYCC format (215) is backward compatible with sRGB devices. The aYCC does not require transmission of any metadata other than a flag, and does not require re-tuning a video compression encoder. While preexisting eYCC formats, such as xvYCC and BT1361, may not properly encompass the entire P3 color space 100, aYCC does not suffer from this deficiency.

Neither xvYCC nor BT1361 can accommodate one hundred percent of the P3 gamut 100 because their OETFs cannot map [−0.225, 1.225] range values to [−0.08, 1.08] range values. The advanced (aYCC) format described herein can, among other things, map [−0.225, 1.225] range values to [−0.08, 1.08] range values. The OETF of the aYCC maps −0.225 to −0.08, and maps 1.225 to 1.08. Two examples of OETFs for the aYCC are set forth in detail below, though other embodiments are possible according to the principles set forth within this disclosure. One OETF is 'implementation friendly,' and the other is first-order continuous.

The implementation friendly OETF has the following general form:

$$y = \begin{cases} -(-x/1.225)^{1/\gamma} * 1.08 & x < 0 \\ 4.5x & 0 \le x \le 0.018 \\ 1.099x^{0.45} + 0.099 & 0.018 < x \le 1 \\ 1 + (x-1)*1.08/1.225 & x > 1 \end{cases} \quad (\text{eqn. 2})$$

In order to simplify operation of the implementation friendly version, it assumed that the region of x>1 is linear, and further assumed that the region of x<0 corresponds to a power function. The implementation friendly OETF maps 1.225 to 1.08; the parameters for doing so are shown in equation 2, above. As can be seen in equation 2, the region in which x is negative (x<0) is expressed as a power function, with power parameter (factor) gamma (γ). Because the implementation friendly OETF needs to map 1.225 to −1.08, the two scaling factors applied to the input and output values are 1.08 and 1.225, as shown above equation 2.

It can, however, be difficult is to determine the appropriate value for power parameter γ. One way of determining an appropriate value for γ is to sweep over a range of γ candidates from 0.5 to 4, and calculate the corresponding peak signal to noise ratios (PSNR) between the original RGB and the RGB processed through the aYCC encoding and decoding procedure, selecting the γ associated with highest PSNR between the two.

FIG. 4B illustrates an example aYCC encoding and decoding method 450 which utilizes the OETF of eqn. 2. Method 450 first encodes 452 received information. The method 450 then may engage in YCC 8-bit quantization 454. Thereafter, the method 450 may engage in 'YCC 444' to 'YCC 420' conversion 456, and then aYCC decoding 458.

Figure 5:
FIG. 5 illustrates training photos for finding an optimal power factor γ in accordance with an exemplary embodiment of this disclosure.
Figure 6:
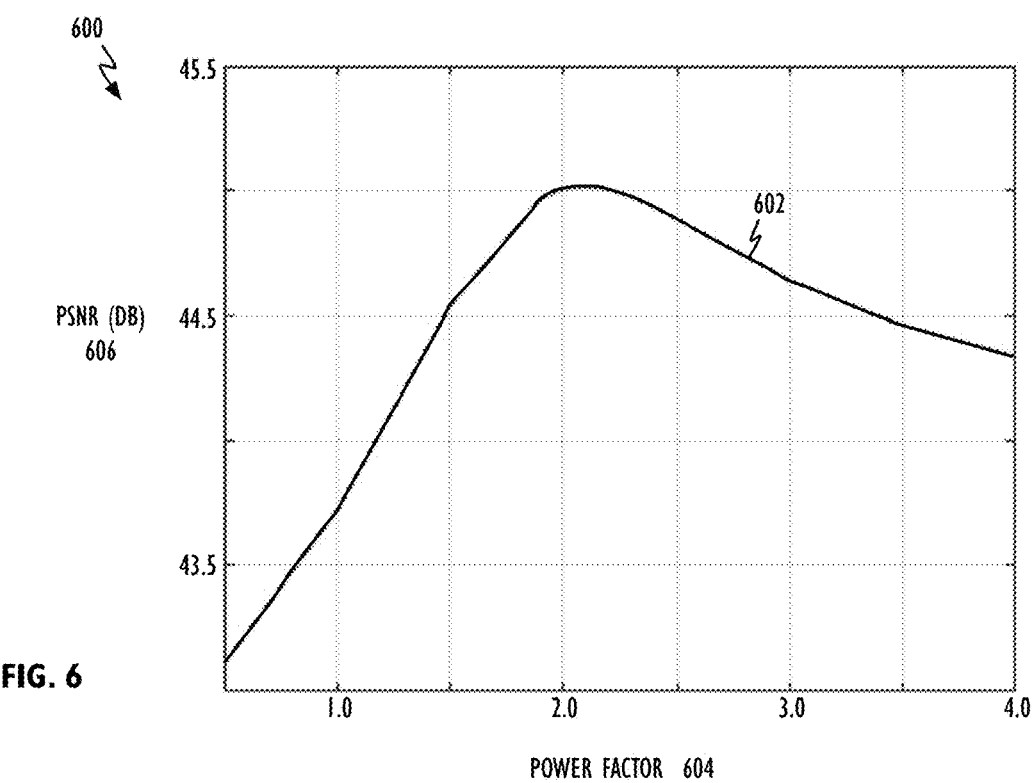
FIG. 6 illustrates an average PSNR over an alternate power factory γ in accordance with an exemplary embodiment of this disclosure.

In at least one embodiment, the content used in training to find the optimal γ may include seventy (70) sequences at a 3840×2160 resolution, captured by an iPhone™ camera, all having saturated P3 only colors. The sequences include can include shiny cars, flowers, and fabrics, for example, as illustrated in FIG. 5. The average PSNRs of the above sequences with respect to different γ are plotted 600 in FIG.

6. As illustrated, curve 602 shows that power factor which is in the range of [1.8 to 2.2] gives best PSNRs 606. If, for simplicity of illustration, γ=2.2 is chosen, then a first OETF curve 1102 is produced, (see FIG. 8, discussed in greater detail below).

The selection of value 2.2 as a good candidate for power factor γ may be validated by comparison with a curve derived by allocating more output range for input colors with larger quantization error measured in 'error difference' ΔE. Such a curve may be generated by first taking a densely sampled subset of all P3 colors representable in the [−0.08 to 1.08] sRGB range, and calculating the ΔE differences between each color and its "neighbors" 1-digital value apart along different color directions. The method by which colors are chosen in this example has no affect, except as to which colors are weighted more when calculating mean color error. In this example, the colors may be chosen on an L*-like sample for R, G, and B values alike. After the colors are chosen, only those with negative R, G, or B values are selected for further calculations.

Second, for each color, the neighboring colors which are one digital value away in multiple color directions are determined. The ΔE differences from the selected color are then calculated. These ΔE values represent local quantization error size in perceptual units.

Third, the average quantization error by the RGB values of each color is aggregated, yielding average quantization ΔE values as a function of pixel values. For the negative part of this function, more output range for input range may be allocated with larger average ΔE values by calculating a cumulative curve from the ΔE values, then normalizing the curve to the [−0.08, 0] range. This normalized curve may contain roughly even ΔE quantization steps in the negative range.

Figure 7:
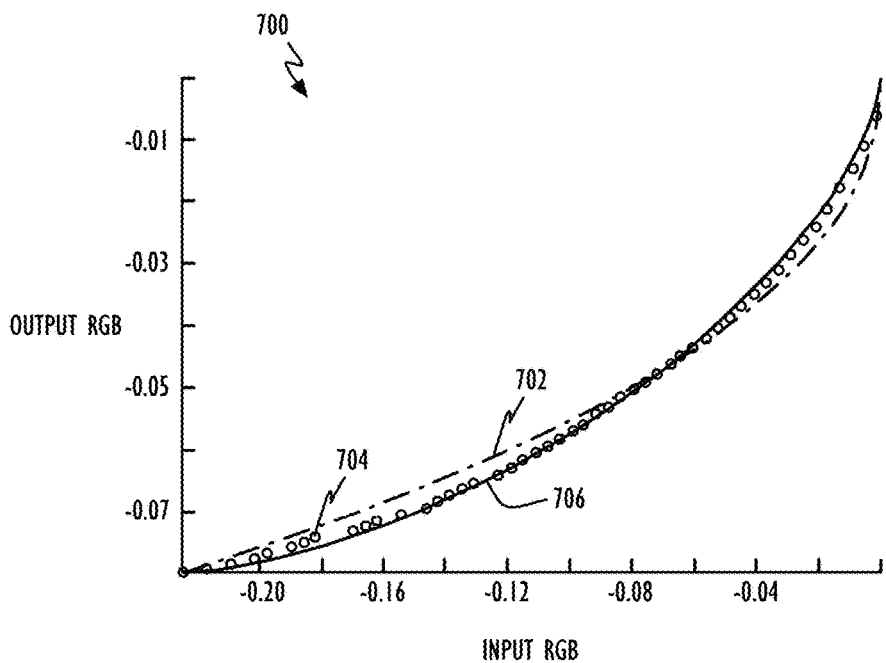
FIG. 7 illustrates an output curve for an output range allocation by perceptual quantization error size in accordance with an exemplary embodiment of this disclosure.

FIG. 7 plots output RGB versus input RGB 700 for the example discussed above. FIG. 7 illustrates the negative portion of the OETF with γ=2.2 plotted 702 alongside a corresponding allocation-by-ΔE curve 704. The allocation-based curve 704 generally follows the γ=2.2 curve 702, verifying the γ=2.2 selection generally. However, as shown in FIG. 7, allocation-based curve 704 is better fitted by a plot 706 of a portion of a Minkowski circle with a 1.55 exponent value than with power function 702. Nevertheless, a power function with γ=2.2 for the negative part of the OETF for aYCC may still be preferred. Compared to allocation-based curve 704, the main difference with the γ=2.2 curve 702 is that curve 702 has a portion which with a near zero slope. This larger portion may be desirable for at least two reasons. The larger portion with a near zero slope gives a smoother transition from the portion of the sRGB main curve above zero. Also, there tend to be more near zero negative pixel values than extreme values in real images. Therefore, providing slightly finer quantization near zero values can be desirable.

Figure 8:
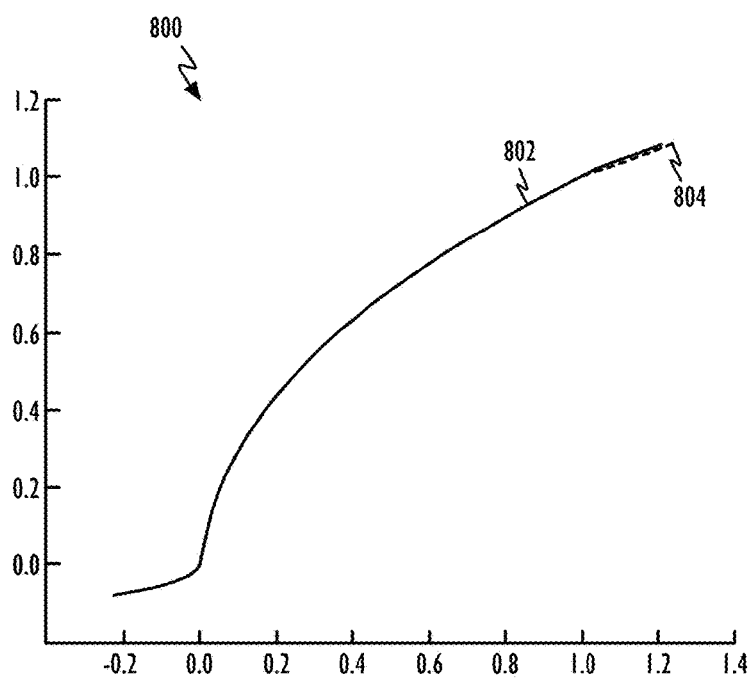
FIG. 8 illustrates two versions of YCC optical-to-electro transfer function curves in accordance with an exemplary embodiment of this disclosure.

FIG. 8 illustrates a plot 800 of a first order continuous version of the aYCC OETF curve 802 discussed below and the implementation friendly version of the aYCC OETF curve 804 discussed above.

In at least one embodiment of this disclosure, the shape of the implementation friendly version 804 of the aYCC OETF can be refined to make the curve continuous and first-order continuous. In order to do so, it may be assumed that the negative portion is a linear function concatenated with a power function y=(kx)½+c with power of ½, and that the big-than-1 portion is in the form of (a+bx)/(d+x). In this embodiment, a restraint may be that the connection points are continuous and first-order continuous. The following function, the plot 802 of which is shown in FIG. 8, for the first-order continuous OETF for aYCC is shown below:

$$y = \begin{cases} -(-0.1719x)^{1/2} - 0.0015 & x < 0 \\ 4.5x & -0.0191^2 \leq x \leq 0.018 \\ 1.099x^{0.45} + 0.099 & 0.018 < x \leq 1 \\ \dfrac{-0.7091 + 1.2846x}{-0.4244 + x} & x > 1 \end{cases} \quad \text{(eqn. 3)}$$

As shown in FIG. 8, the two versions of aYCC OETF (802, 804) are quite similar, but the first-order continuous version 802 is smoother.

Table 1 shows the 8-bit Y, Cb, Cr values for the six P3 primaries coded with aYCC. The maximum is 253, and the minimum is 5. (255 and 0 of YCbCr cannot be used.) The aYCC uses all available space without clamping.

TABLE 1

|       | B   | W   | P3 R | P3 G | P3 B | P3 M | P3 C | P3 Y |
|-------|-----|-----|------|------|------|------|------|------|
| Y     | 16  | 235 | 60   | 170  | 32   | 77   | 187  | 218  |
| $C_b$ | 128 | 128 | 101  | 37   | 244  | 219  | 155  | 10   |
| $C_r$ | 128 | 128 | 253  | 16   | 117  | 242  | 5    | 139  |

As an interesting comparison, Table 2 shows the 8-bit Y, Cb, Cr values for the six sRGB primaries coded with aYCC/regular YCC.

TABLE 2

|       | B   | W   | sRGB R | sRGB G | sRGB B | sRGB M | sRGB C | sRGB Y |
|-------|-----|-----|--------|--------|--------|--------|--------|--------|
| Y     | 16  | 235 | 63     | 173    | 32     | 78     | 188    | 219    |
| $C_b$ | 128 | 128 | 102    | 42     | 240    | 214    | 154    | 16     |
| $C_r$ | 128 | 128 | 240    | 26     | 118    | 230    | 16     | 138    |

There are at least two observations that can be made with regard to the information in Table 1 and Table 2. First, sRGB and P3 share the same white point with a same brightness, but P3 RGB primaries are brighter than sRGB primaries. Second, in aYCC, the max Y value is 235, and the min Y value is 16. Thus the luma channel does not go out of video range. Only the two chroma channels go out of the video range: [5, −253].

The fact that P3 RGB primaries are brighter than sRGB primaries when sRGB and P3 share the same white point with the same brightness is not reflected in Table 1 and Table 2. P3 primaries are not brighter than sRGB primaries when measured by luma values (Y). Because of the negative values in P3 primaries and OETF curves, the luma values (Y) of P3 primaries in aYCC are not their true luma values.

Figure 9:
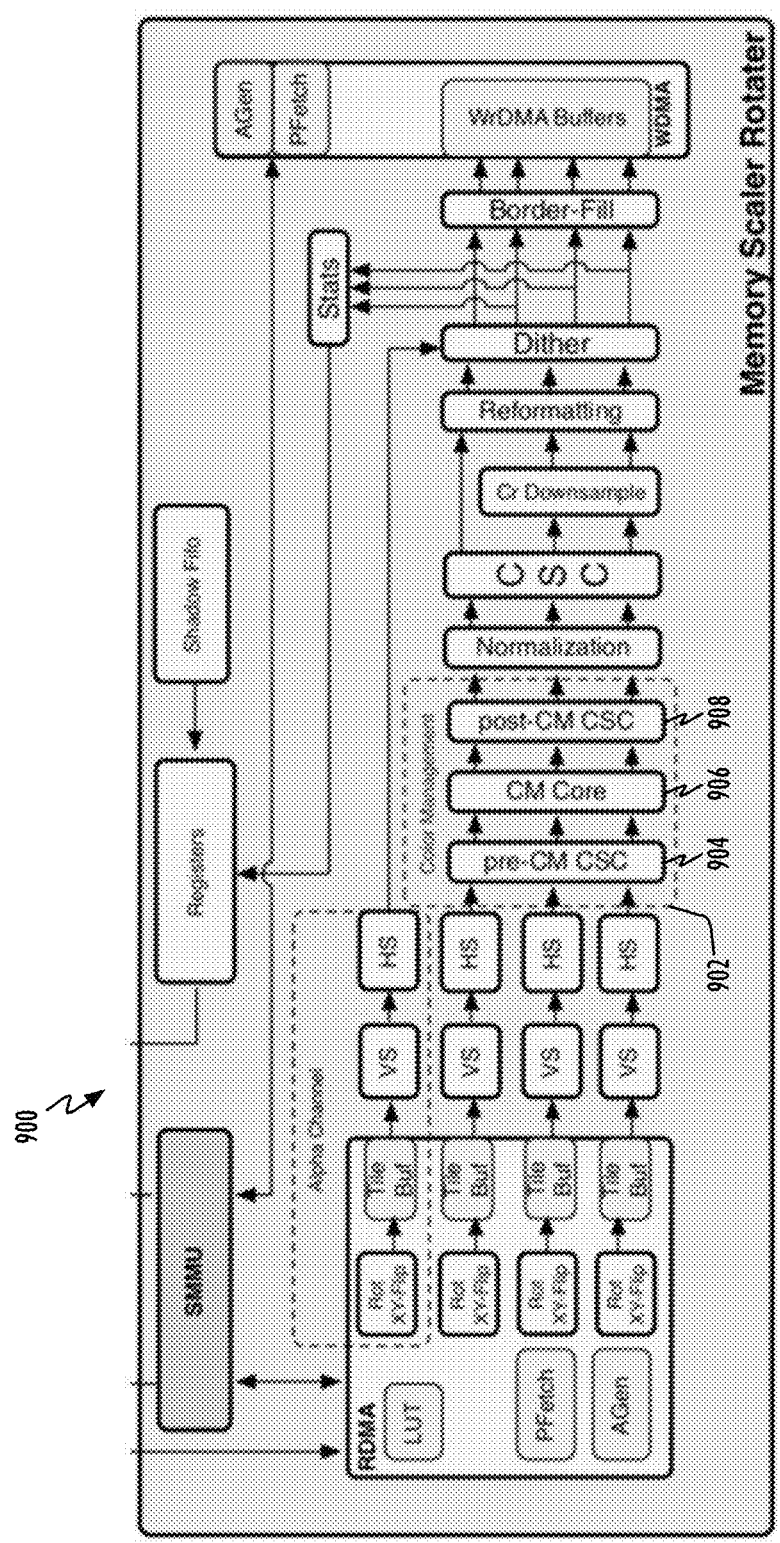
FIG. 9 illustrates a block-diagram of a memory scale rotater in accordance with an exemplary embodiment of this disclosure.

FIG. 9 is a block diagram of a memory scale rotator (MSR) 900 which can be used to implement at least one embodiment of an aYCC encoder in electronic computing devices such as iOS™ devices, for example. The example MSR 900 can be implemented in Maui™. Color management (CM) block 902 can be used to implement aYCC. CM block 902 has three components: a pre-CM color space converter (CSC) 904, CM Core 906, and post-CM CSC 908. The CM core 906 also has 3 components: a DeGamma Look Up Table, a 3×3 matrix, and a Gamma LUT (not shown in FIG. 9).

Figure 10:
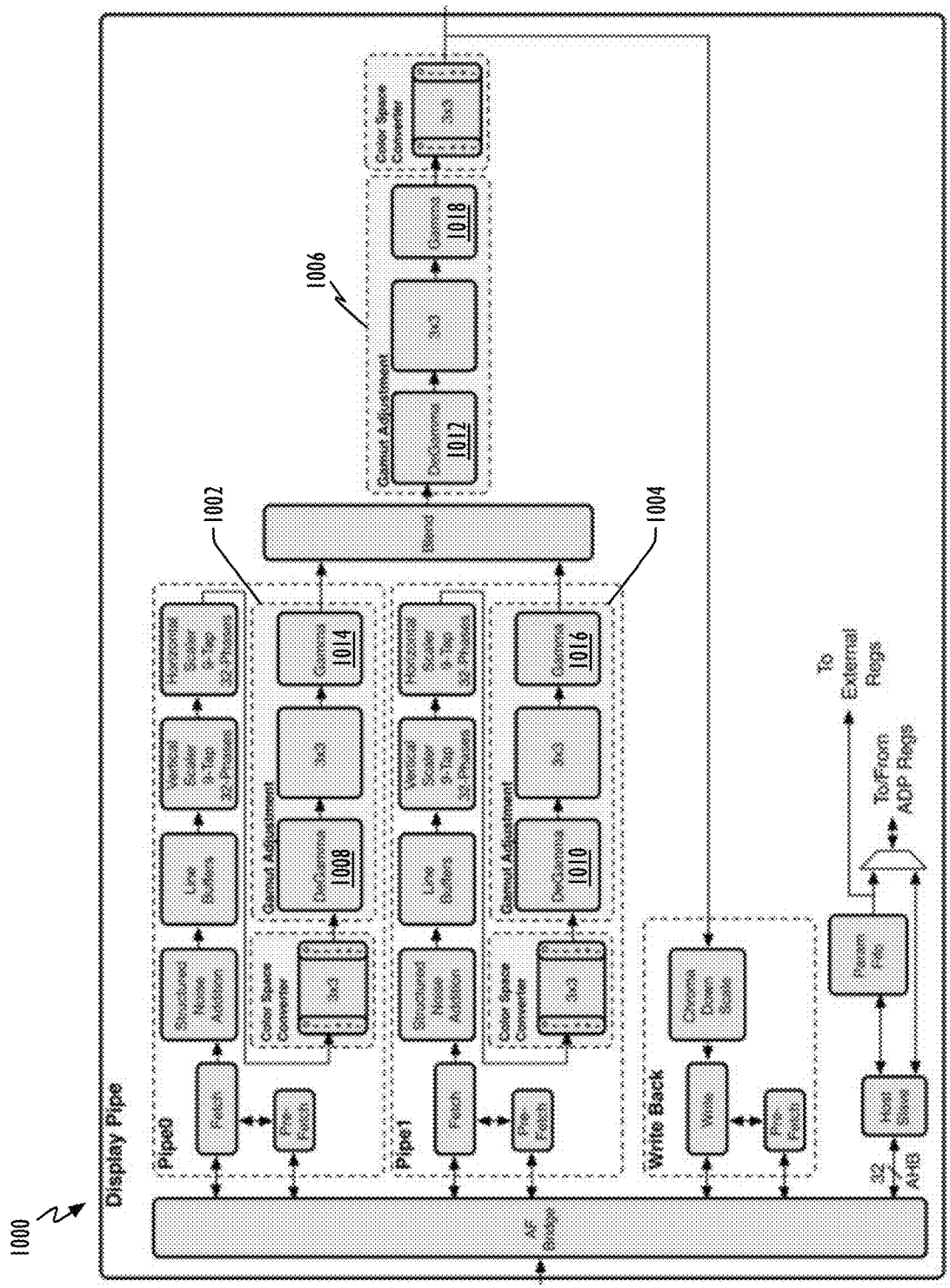
FIG. 10 illustrates a block-diagram of a display process in accordance with an exemplary embodiment of this disclosure.

FIG. 10 is a block diagram of an application display pipe (ADP). An ADP can be an Apple Display Pipe™. ADP 1000 has an aYCC to P3 decoder. An aYCC to P3 decoder can be implemented in MSR 900 (see FIG. 9) or ADP 1000. ADP 1000 has three CM blocks 1002, 1004, and 1006, also known as Gamut Adjustment Blocks.

As illustrated in FIG. 10, DeGamma LUTs 1008, 1010, 1012 convert pixels from the gamma domain to the linear domain, while the Gamma LUTs 1014, 1016, 1018 convert from the linear domain to the gamma domain. The DeGamma LUT 1008, 1010, 1012 may be used to implement the EOTF of aYCC and the Gamma LUTs 1014, 1016, 1018 may be used to implement the OETF of aYCC.

The DeGamma LUTs 1008, 1010, 1012 support a wide range of input, including negative and greater-than-1 values. Specifically, the input in [0, 1] has 128 entries of 13.5 bits (in ADP 1000) or 12.5 bits (in MSR 900) integer values. Linear interpolation may be used to determine a value in between two entries. There are two entries for greater-than-1 input values. One entry is fixed at 1, and the other entry is configurable. All the values greater-than-1 are linearly interpolated or linearly extrapolated with respect to these two entries. The negative input shares the same 128-entry table for input in [0, 1] plus a negative sign. For a positive input x, which x<1, the DeGamma LUTs 1008, 1010, 1012 gives f(x); for a negative input −x, the LUT gives −f(x). Thus, the negative part in DeGamma LUT 1008, 1010, 1012 cannot be freely set.

Each Gamma LUT 1014, 1016, 1018 is the same as the DeGamma LUTs except that there are 1024 entries for input in [0, 1] in the Gamma LUT 1014, 1016, 1018.

Because the negative input of DeGamma and Gamma LUTs is constrained to use the mirrored curve of the positive input, DeGamma and Gamma LUTs cannot be set to the negative parts of EOTF and OETF curves of aYCC. In this example, only the positive portion of LUTs can be used to implement aYCC's OETF and EOTF. Consequently, the input may be offset and scaled to make the input range correct for the two LUTs. Furthermore, the output of LUTs cannot be negative and hence needs to be offset and scaled as well. Scaling and adding offset before and after DeGamma and Gamma LUTs can be implemented in various hardware arrangements, so the calculations described above can be spread into different calculation units before and after DeGamma and Gamma LUTs.

Figure 11:
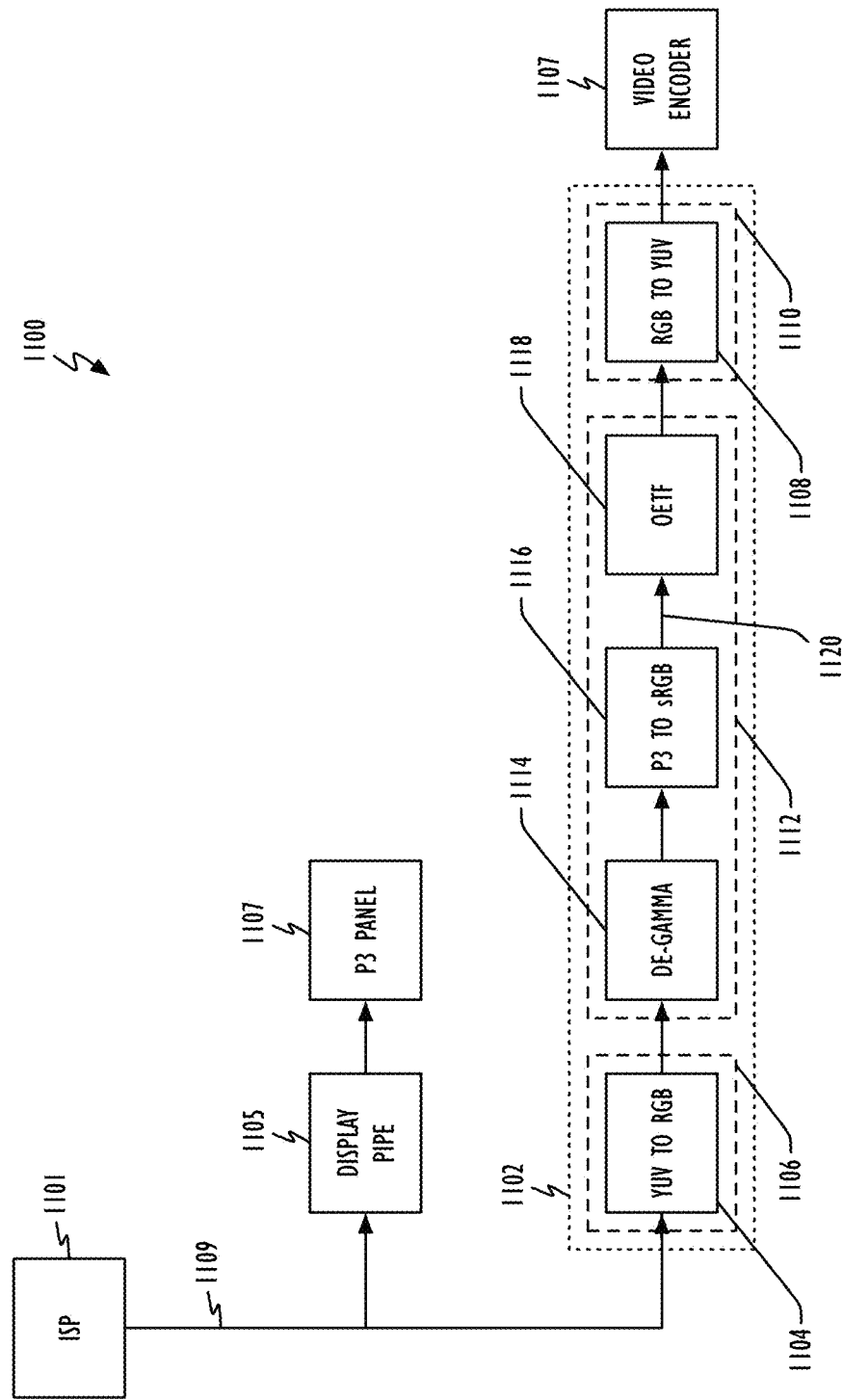
FIG. 11 illustrates a block-diagram of a YCC encoder implemented in an memory scale rotater in accordance with an exemplary embodiment of this disclosure.

FIG. 11 shows a block-diagram 1100 of an example aYCC encoder 1102 implemented in MSR 900. The aYCC encoder 1102 encodes data 1109 from image signal processor (ISP) 1101 for use by video encoder 1103. As shown in FIG. 11, ISP data 1109 can also be provided to display pipe 1105 for display on a P3 display panel 1107. The Pre-CM CSC 1106 receives ISP data 1109 for processing. YUV to RGB conversion 1104 is utilized by Pre-CM CSC 1106, and, RGB to YUV conversion 1108 is utilized by Post-CM CSC 1110.

The CM core 1112 includes DeGamma LUT 1114, a 3-by-3 P3 to sRGB matrix converter 1116, and OETF 1118. The 127+2-entry DeGamma LUT 1114 utilizes the de-gamma curve of BT.709. The 1024+2-entry Gamma LUT utilizes the aYCC OETF curve described above. The values for DeGamma LUT 1114, a 3-by-3 matrix 1116, and OETF 1118 are scaled or offset, or both, to enable aYCC OETF 1118 to operate.

To avoid using the negative portion of the Gamma LUT, all the negative inputs of aYCC OETF may adjusted raised by adding an offset value. It may, however, be advantageous to use Gamma LUT's over the one (1) portion, not only for the purpose of preserving more entries for better [−0.225, 1], but also for making one (1) as an available entry. Specifically, the mapping constraints between the original input of 1120 OETF and the input of Gamma LUT are −0.225 to zero (0), and 1 to 1. Within these constraints, a mapping function can be derived as y=k(x+offset), with offset=0.225 and k=1/1.225. Mapping of the critical points of the derived function is as follows: −0.225 is mapped to zero (0); zero (0) is mapped to 0.225/1.225; 1.0 is mapped to 1.0; and 1.225 is mapped to 1.45/1.225. The scaling factor k may be combined with 3×3 matrix (P3 to sRGB) 1116 by scaling every element of the matrix by 1/1.225. The offset may be combined into de-gamma (BT.709) LUT 1114 by adding 0.225 to the original de-gamma values. The output range of DeGamma LUT 1114 may be [0.225, 1.225]. The OETF 1118 has negative output values that are not supported by the Gamma LUT. Therefore an offset of 0.08 may be added to the original OETF values. In the example of FIG. 11, the output range of Gamma LUT that is used to implement the OETF function 1118 is [0, 1.16]. The offset added to the Gamma LUT output is compensated back in Post-CM CSC 1110.

Figure 12:
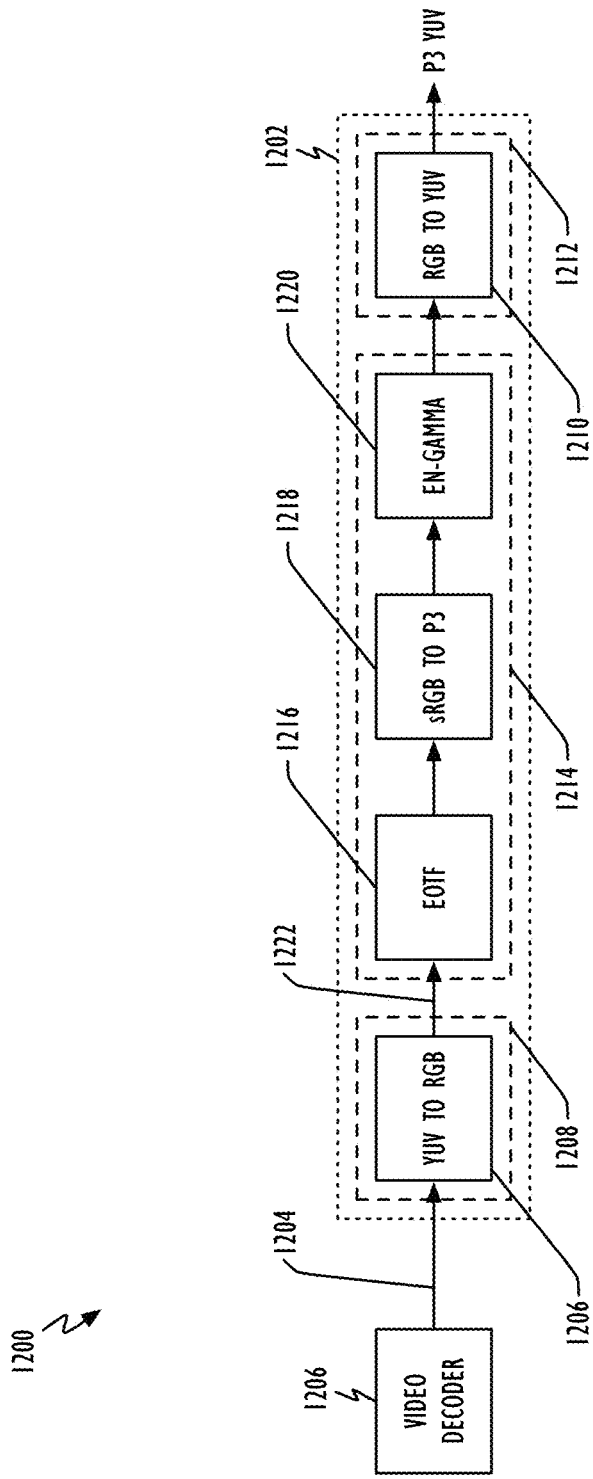
FIG. 12 illustrates a block-diagram of a YCC decoder to convert to P3 in accordance with an exemplary embodiment of this disclosure.

FIG. 12 is a block-diagram 1200 of an example aYCC to P3 decoder 1202, which may be implemented in MSR 900 or ADP 1000 or both. The aYCC decoder 1202 may receive P3 YUV input 1204 from video decoder 1206, for example. BT.709 YUV to RGB conversion 1206 may be utilized by Pre-CM CSC 1208. BT.709 RGB to YUV conversion 1210 may be utilized by Post-CM CSC 1212.

CM Core 1214 may include 128+2-entry Gamma LUT 1216, 3-by-3 sRGB to P3 conversion matrix 1218, and 1024+2-entry Gamma LUT 1220. The 1024+2-entry Gamma LUT may utilize BT.709 en-gamma. The 128+2-entry Gamma LUT uses aYCC EOTF 1217. The color values for Pre-CM CSC 1208 and CM core 1214 are scaled and offset in order to make aYCC EOTF 1217 work.

To avoid using the negative portion of DeGamma LUT, an offset may be added to its input. It may be desirable to use DeGamma LUT's over the one (1) portion, not only for the purpose of preserving more entries for better [−0.08, 1] mapping, but also for enabling one (1) as an entry. Therefore, the mapping between the original input 1222 to EOTF 1217 and the input of DeGamma LUT has the following constraints: −0.08 is mapped to zero (0) and one (1) is mapped to one (1). The mapping applied to the input of DeGamma LUT is y=kx+offset, with offset=0.08/1.08 and k=1/1.08. The input range of DeGamma LUT thus becomes [0, 1.16/1.08], and critical input values 1204 of EOTF are mapped according to the following relationship: −0.08 is mapped to zero (0); zero (0) is mapped to 0.08/1.08; 1.0 is mapped to 1.0; and 1.08 is mapped to 1.16/1.08. Parameters offset and k are absorbed in the Pre-CM CSC 1208 by altering its original 3×3 matrix and offset.

The output of DeGamma LUT cannot be negative, so an offset of 0.225 may be added to the true value for correction. The output range of DeGamma LUT is [0, 1.45].

This offset added to the DeGamma LUT output cannot be removed by the 3×3 sRGB to P3 matrix 1218. The offset will carry over to the Gamma LUT that is used by BT.709 OETF. To avoid making input of en-gamma LUT greater than one (1), the elements in this matrix may divided by scaling factor of 1.225. Without applying this scaling factor, the output of the 3×3 matrix is [0.225, 1.225]. With the scaling factor, it becomes [0.225/1.225, 1.0]. Application of the scaling factor is equivalent to applying the linear function y=(x+0.225)/1.225 to the input of the Gamma LUT with zero (0) mapped to 0.225/1.225, and 1.0 mapped to 1.0. Because the original zero (0) is mapped to 0.225/1.225, the Gamma LUT starts from 0.225/1.225, not from zero (0).

Figure 13:
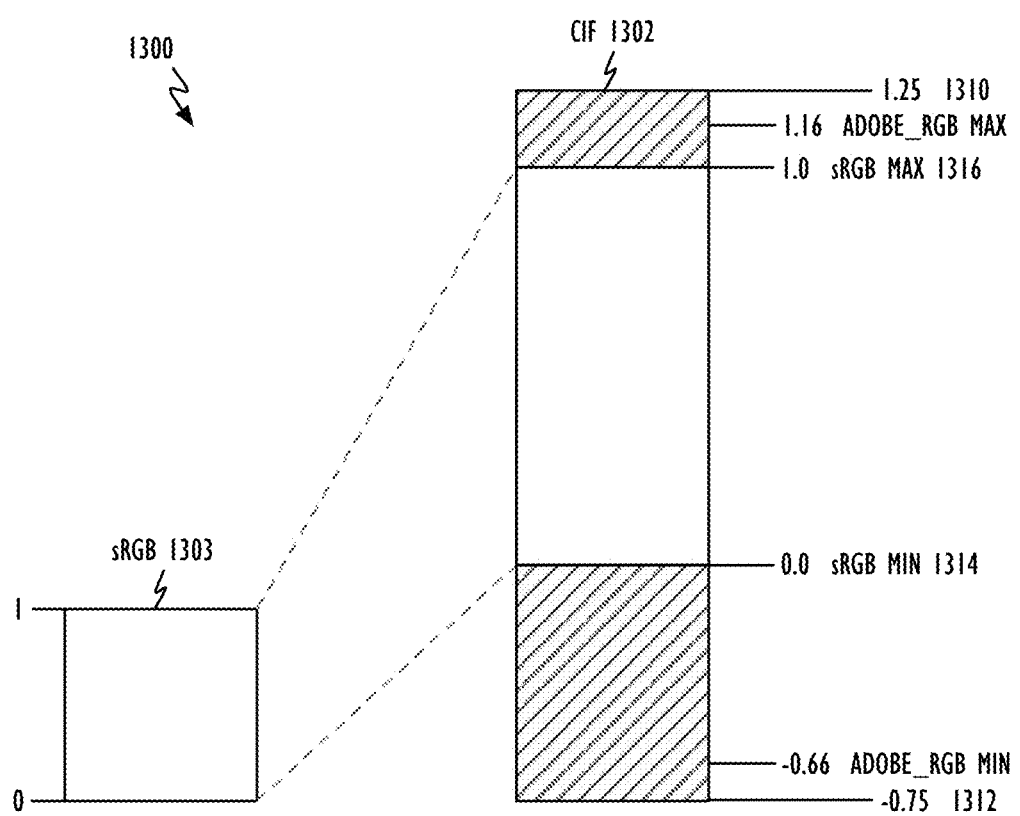
FIG. 13 illustrates a range of a Color Interchange 10 bit Format and its relationship with the sRGB color space in accordance with an exemplary embodiment of this disclosure.

CIF10 (Color Interchange Format 10 bit) is an example RGB buffer format for WCG 100. FIG. 13 illustrates the mapping 1300 from signed to unsigned integers in CIF10 1302, the range of CIF10 1302, and its relationship to sRGB 1303. To facilitate blending with sRGB graphical content 1303, CIF10 1302 represents the WCG colors with sRGB primaries, and the negative values and greater-than-1 values are preserved without clamping. The CIF10 1302 is in the gamma corrected domain, and it uses sRGB gamma. CIF10 1302 uses unsigned 10-bit integers to represent signed integers. Specifically, zero (0) is mapped to code value 384 (1314), and one (1) is mapped to code value 895 (1316). Therefore, five hundred and twelve (512) quantization levels (nine (9) bits) are used to represent [0,1], and CIF10 1302 has the range of [−0.75, 1.25] (1312, 1310). The narrower range of the AdobeRGB (1.16, −0.66) is shown for comparison.

CIF10 1302 has similarities with eYCC. Both use sRGB primaries to represent WCG colors; both have negative and greater-than 1 RGB values and OETF/OETF curves support these RGB values. However, because eYCC is suitable for transmission and storage, and CIF10 1302 is suitable for blending, there differences. For example, CIF10 1302 is a RGB format, while eYCC is a YCC format; CIF10's gamma/OETF is the extension of sRGB gamma, while eYCC's OETF is the extension of BT.709 gamma; CIF10 has a broader RGB range than eYCC in the gamma domain: [−0.75, 1.25] vs. [−0.08 1.08]; and CIF10 is 10-bit while eYCC is 8-bit.

Figure 14:
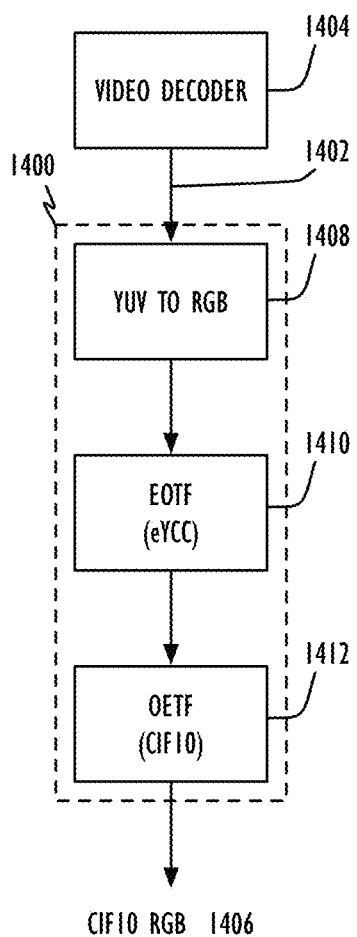
FIG. 14 illustrates an extended YYC decoder in accordance with an exemplary embodiment of this disclosure.

FIG. 14 is a block diagram of an example aYCC decoder 1400 for a P3 enabled device. As shown, eYCC or aYCC output 1402 may be received from video decoder 1404 by aYCC decoder 1400. The output 1402 is converted into CIF RGB by aYCC decoder 1400. As shown, aYCC decoder 1400 may include YUV to RGB converter 1408, EOTF 1410, and OETF 1412. In at least one embodiment, EOTF 1410 and OETF 1412 may be combined.

Figure 15:
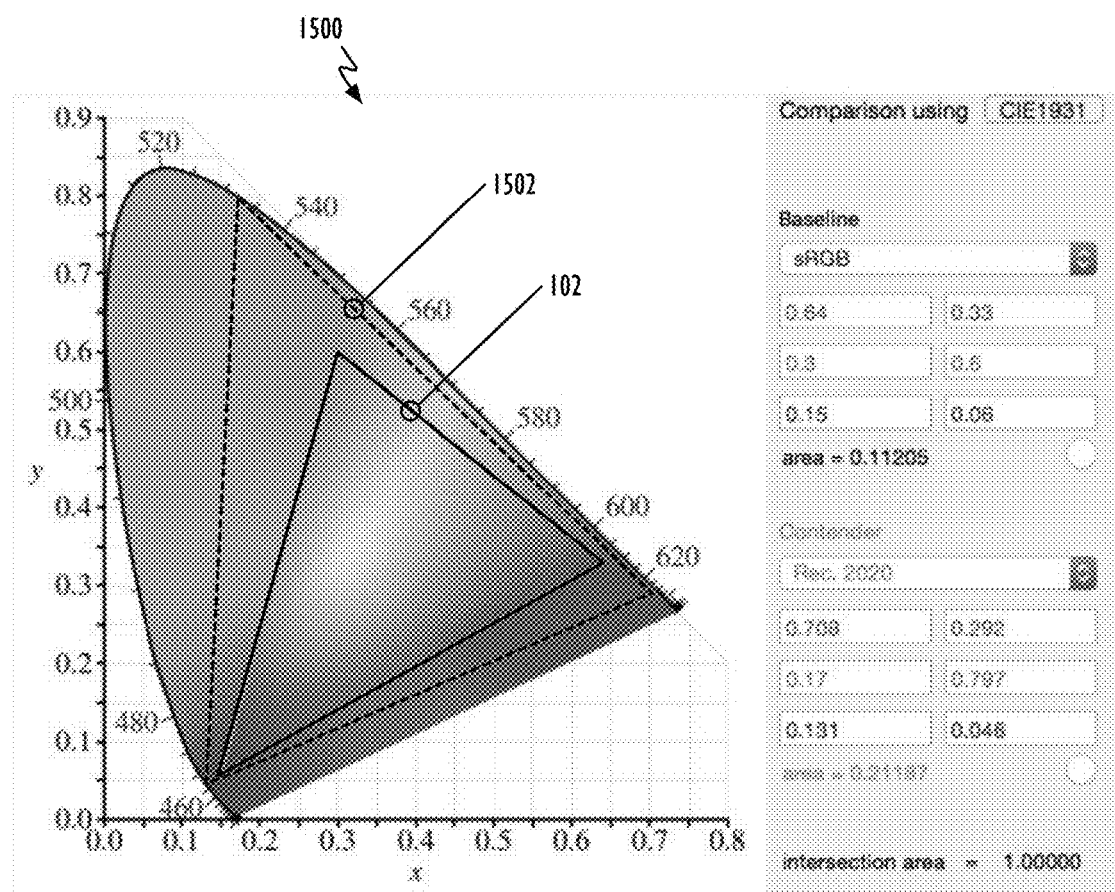
FIG. 15 illustrates a comparison of an advanced color gamut with the sRGB color space in the CIE 1931 x-y color chromatic chart, in accordance with an exemplary embodiment of this disclosure.

To work with the current 8-bit H264 or other standard, aYCC may need to be chroma-downsampled and quantized to YUV420 8-bit for storage and transmission of P3 contents. As 8-bit is the case with BT.709/601, there is no visible artifact for camera captured natural P3 contents in 8 bit aYCC420 format. As in 8-bit BT.709/601, there might be visible banding artifact in 8 bit aYCC420 graphical contents. 10-bit aYCC may benefit from the increased 2 bits by greatly removing or reducing the banding artifact. As noted above aYCC OETF is designed for P3 colors. Recently Rec. 2020 (a/k/a BT. 2020), defines various aspects of UHDTV, has become popular and is supported by various standards such as HDMI 2.0, H.264, HEVC, Blu-ray Disc, etc. Rec. 2020 features the much bigger color gamut 1502 illustrated in FIG. 15. Rec.2020 proposes new RGB and YCC conversion matrices, gamma, and uses 12 bits. In the light of backward compatibility features discussed herein, it is possible to derive an eYCC OETF which can fully support the Rec. 2020 color gamut 1502.

Figure 16:
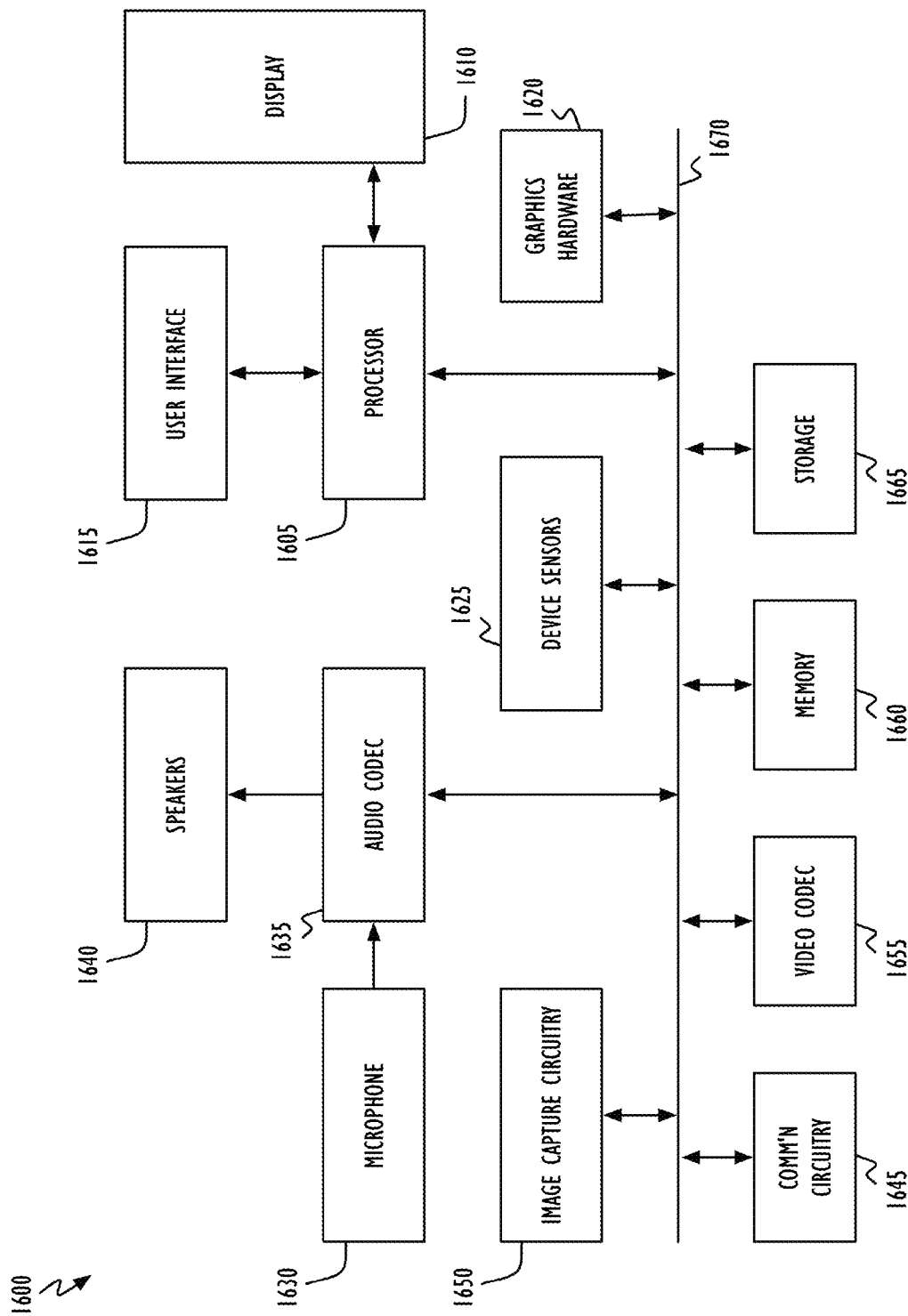
FIG. 16 illustrates a block diagram of an exemplary electronic device capable of implementing methods of this disclosure.

FIG. 16 is a simplified functional block diagram of illustrative electronic device 1600 is shown according to one embodiment. Electronic device 1600 could be, for example, a mobile telephone, personal media device, portable camera, or a tablet, notebook or desktop computer system. As shown, electronic device 1600 may include processor 1605, display 1610, user interface 1615, graphics hardware 1620, device sensors 1625 (e.g., proximity sensor/ambient light sensor, accelerometer and/or gyroscope), microphone 1630, audio codec(s) 1635, speaker(s) 1640, communications circuitry 1645, image capture circuit or unit 1650, video codec(s) 1655 (such as eYCC or aYCC), memory 1660, storage 1665, and communications bus 1670.

Processor 1605 may execute instructions necessary to carry out or control the operation of many functions performed by device 1600 (such processing image and video data/information in accordance with FIGS. 2, 3, 4, 4B, 9, 10, 11, 12, and 14). Processor 1605 may, for instance, drive display 1610 and receive user input from user interface 1615. User interface 1615 can take a variety of forms, such as a button, keypad, dial, a click wheel, keyboard, display screen and/or a touch screen. User interface 1615 may, for example, be the conduit through which a user may select WCG/P3 100 images to be rendered on display 1610. Processor 1605 may be a system-on-chip such as those found in mobile devices and include one or more dedicated graphics processing units (GPUs). Processor 1605 may be based on reduced instruction-set computer (RISC) or complex instruction-set computer (CISC) architectures or any other suitable architecture and may include one or more processing cores. Graphics hardware 1620 may be special purpose computational hardware for processing graphics and/or assisting processor 1605 perform computational tasks. In one embodiment, graphics hardware 1620 may include one or more programmable graphics processing units (GPUs).

Image capture circuitry 1650 may capture still and video images that may be processed to generate images and may, in accordance with this disclosure, include image processing MSR 900 and ADP 1000. Output from image capture circuitry 1650 may be processed, at least in part, by video codec(s) 1655 and/or processor 1605 and/or graphics hardware 1620, and/or a dedicated image processing unit incorporated within circuitry 1650. Images so captured may be stored in memory 1660 and/or storage 1665. Memory 1660 may include one or more different types of media used by processor 1605, graphics hardware 1620, and image capture circuitry 1650 to perform device functions. For example, memory 1660 may include memory cache, read-only memory (ROM), and/or random access memory (RAM). Storage 1665 may store media (e.g., audio, image and video files), computer program instructions or software, preference information, device profile information, and any other suitable data. Storage 1665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1660 and storage 1665 may be used to retain computer program instructions or code organized into one or more modules and written in any desired computer programming language. When executed by, for example, processor 1605 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, FIG. 4B, which is a workflow diagram for an example aYCC decoder 301. In one or more embodiments, one or more of the disclosed steps of FIG. 4B may be omitted, repeated, and/or performed in a different order than that described herein. Accordingly, the specific arrangement of steps or actions of this disclosure, such as those illustrated in FIG. 4B should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A wide gamut encoder method, comprising:
   receiving, from one or more sensors in a remote electronic device, a wide gamut color image having a color gamut based on the P3 color space which includes x-y color chromatic values of 0.68 and 0.32 for red, 0.265 and 0.69 for green, and 0.15 and 0.06 for blue;
   encoding one or more wide gamut color image pixel values in a first range corresponding to values specified by a narrow gamut standard into a first portion of a narrow gamut encoding element, wherein the narrow gamut standard has a narrow color gamut that is narrower than the color gamut of the P3 color space;
   encoding one or more wide gamut color image pixel values in a second range into a second portion of the narrow gamut encoding element, wherein values in the second range are less than any value in the first range, and all values in the second portion are specified to be outside the narrow color gamut of the narrow gamut standard;
   encoding one or more wide gamut color image pixel values in a third range into a third portion of the narrow gamut encoding element, wherein values in the third range are greater than any value in the first range, and all values in the third portion are specified to be outside the narrow color gamut of the narrow gamut standard;
   implementing an optical-to-electro transfer function (OETF) curve on the narrow gamut encoding element to map all values in the second portion to a first extended range outside the narrow color gamut, and map all values in the third portion to a second extended range outside the narrow color gamut;
   converting, after implementing the OETF curve, the narrow gamut encoding element from a first color space to a second color space corresponding to the narrow color gamut, wherein output values of the OETF curve in the first extended range and in the second extended range all reside within bit a full range of codes corresponding to a predetermined number of bits of the second color space while using codes outside of a subset range of codes that is within the full range and that corresponds to the narrow color gamut of the second color space; and
   sending the converted narrow gamut encoding element to an electronic display device.

2. The method of claim 1, wherein receiving a wide gamut color image comprises:
   receiving a first wide gamut color image encoded in a third color space; and
   converting the first wide gamut color image into a fourth color space to generate the wide gamut color image.

3. The method of claim 2, wherein receiving a wide gamut color image further comprises applying a de-gamma operation in response to converting the first wide gamut color image into the fourth color space.

4. The method of claim 3, wherein:
   the second color space comprises the YUV color space; and
   the third color space of the first wide gamut color image comprises the P3 color space.

5. The method of claim 1, wherein the narrow color gamut comprises the sRGB gamut.

6. The method of claim 1, further comprising including a tag in the narrow gamut encoding element.

7. The method of claim 6, further comprising:
   receiving the narrow gamut encoding element;
   identifying the tag in the narrow gamut encoding element;
   converting the narrow gamut encoding element from a third color space to a fourth color space in response to identifying the tag; and
   generating, in response to the converting, a wide gamut color image pixel value based on the first and second and third portions of the narrow gamut encoding element.

8. A non-transitory computer readable storage medium storing instructions executable by a processor, wherein the instructions, when executed by the processor, cause the processor to:
   receive, from one or more sensors in a remote electronic device, a wide gamut color image having a color gamut based on the P3 color space which includes x-y color chromatic values of 0.68 and 0.32 for red, 0.265 and 0.69 for green, and 0.15 and 0.06 for blue;
   encode one or more wide gamut color image pixel values in a first range corresponding to values specified by a narrow gamut standard into a first portion of a narrow gamut encoding element, wherein the narrow gamut standard has a narrow color gamut that is narrower than the color gamut of the P3 color space;
   encode one or more wide gamut color image pixel values in a second range into a second portion of the narrow gamut encoding element, wherein values in the second range are less than any value in the first range, and all values in the second portion are specified to be outside the narrow color gamut of the narrow gamut standard;
   encode one or more wide gamut color image pixel values in a third range into a third portion of the narrow gamut encoding element, wherein values in the third range are greater than any value in the first range, and all values in the third portion are specified to be outside the narrow color gamut of the narrow gamut standard;
   implement an optical-to-electro transfer function (OETF) curve on the narrow gamut encoding element to map all values in the second portion to a first extended range outside the narrow color gamut, and map all values in the third portion to a second extended range outside the narrow color gamut;
   convert, after implementing the OETF curve, the narrow gamut encoding element from a first color space to a second color space corresponding to the narrow color gamut, wherein output values of the OETF curve in the first extended range and in the second extended range all reside within a full range of codes corresponding to a predetermined number of bits of the second color space while using codes outside of a subset range of codes that is within the full range and that corresponds to the narrow color gamut of the second color space; and send the converted narrow gamut encoding element to an electronic display device.

9. The non-transitory computer readable storage medium of claim 8, wherein the instructions which when executed by the processor cause the processor to receive a wide gamut color image comprise instructions which when executed by the processor cause the processor to:

receive a first wide gamut color image encoded in a third color space; and convert the first wide gamut color image into a fourth color space to generate the wide gamut color image.

10. The non-transitory computer readable storage medium of claim 9, wherein the instructions which when executed by the processor cause the processor to receive a wide gamut color image further comprise instructions which when executed by the processor cause the processor to apply a de-gamma operation in response to converting the first wide gamut color image into the fourth color space.

11. The non-transitory computer readable storage medium of claim 10, wherein:

the second color space comprises the YUV color space; and the third color space of the first wide gamut color image comprises the P3 color space.

12. The non-transitory computer readable storage medium of claim 8, wherein the narrow color gamut comprises the sRGB gamut.

13. The non-transitory computer readable storage medium of claim 8, further comprising instructions which when executed by the processor cause the processor to include a tag in the narrow gamut encoding element.

14. The non-transitory computer readable storage medium of claim 13, further comprising instructions which when executed by the processor cause the processor to:

receive the narrow gamut encoding element;

identify the tag in the narrow gamut encoding element;

convert the narrow gamut encoding element from a third color space to a fourth color space upon identification of the tag; and generate, in response to the converting, a wide gamut color image pixel value based on the first and second and third portions of the narrow gamut encoding element.

15. A wide gamut encoder comprising:

a processor;

a non-transitory computer readable storage medium in signal communication with the processor, storing instructions, which when executed by the processor, cause the processor to:

receive, from one or more sensors in a remote electronic device, a wide gamut color image having a color gamut based on the P3 color space which includes x-y color chromatic values of 0.68 and 0.32 for red, 0.265 and 0.69 for green, and 0.15 and 0.06 for blue;

encode one or more wide gamut color image pixel values in a first range corresponding to values specified by a narrow gamut standard into a first portion of a narrow gamut encoding element, wherein the narrow gamut standard has a narrow color gamut that is narrower than the color gamut of the P3 color space;

encode one or more wide gamut color image pixel values in a second range into a second portion of the narrow gamut encoding element, wherein values in the second range are less than any value in the first range, and all values in the second portion are specified to be outside the narrow color gamut of the narrow gamut standard;

encode one or more wide gamut color image pixel values in a third range into a third portion of the narrow gamut encoding element, wherein values in the third range are greater than any value in the first range, and all values in the third portion are specified to be outside the narrow color gamut of the narrow gamut standard;

implement an optical-to-electro transfer function (OETF) curve on the narrow gamut encoding element to map all values in the second portion to a first extended range outside the narrow color gamut, and map all values in the third portion to a second extended range outside the narrow color gamut;

convert, after implementing the OETF curve, the narrow gamut encoding element from a first color space to a second color space corresponding to the narrow color gamut, wherein output values of the OETF curve in the first extended range and in the second extended range all reside within a full range of codes corresponding to a predetermined number of bits of the second color space while using codes outside of a subset range of codes that is within the full range and that corresponds to the narrow color gamut of the second color space; and send the converted narrow gamut encoding element to an electronic display device.

16. The wide gamut encoder of claim 15, wherein the instructions which when executed by the processor cause the processor to receive a wide gamut color image comprise instructions which when executed by the processor cause the processor to:

receive a first wide gamut color image encoded in a third color space; and convert the first wide gamut color image into a fourth color space to generate the wide gamut color image.

17. The wide gamut encoder of claim 16, wherein the instructions which when executed by the processor cause the processor to receive a wide gamut color image further comprise instructions which when executed by the processor cause the processor to apply a de-gamma operation in response to converting the first wide gamut color image into the fourth color space.

18. The wide gamut encoder of claim 15, wherein the electronic display device is an sRGB display device.

19. The wide gamut encoder of claim 16, wherein:

the second color space comprises the YUV color space; and the third color space of the first wide gamut color image comprises the P3 color space.

* * * * *

UNITED STATES PATENT AND TRADEMARK OFFICE
CERTIFICATE OF CORRECTION

PATENT NO. : 10,205,967 B2  
APPLICATION NO. : 15/070620  
DATED : February 12, 2019  
INVENTOR(S) : Hao Pan et al.

Page 1 of 1

It is certified that error appears in the above-identified patent and that said Letters Patent is hereby corrected as shown below:

In the Claims

Claim 1 at Column 13, Line 56 should read -- all reside within a full range of codes corresponding --

Signed and Sealed this
Nineteenth Day of March, 2019

Andrei Iancu
*Director of the United States Patent and Trademark Office*